United States Patent [19]

Iseki

[11] Patent Number: 5,041,946
[45] Date of Patent: Aug. 20, 1991

[54] PLASTIC CONTROL DEVICE

[75] Inventor: Masahiro Iseki, Tsukuba, Japan

[73] Assignee: Sanyo Electric Co., Ltd., Moriguchi, Japan

[21] Appl. No.: 538,619

[22] Filed: Jun. 15, 1990

[30] Foreign Application Priority Data

Jun. 19, 1989 [JP] Japan .................................. 1-156991
Sep. 26, 1989 [JP] Japan .................................. 1-249570

[51] Int. Cl.$^5$ .............................................. H01G 9/05
[52] U.S. Cl. ..................................... 361/523; 252/500
[58] Field of Search ............................. 361/523–527; 252/500, 64; 29/25.03

[56] References Cited

U.S. PATENT DOCUMENTS

| 3,883,784 | 5/1975 | Peck et al. | 252/64 X |
| 4,858,078 | 8/1989 | Morimoto et al. | 361/527 |
| 4,933,106 | 6/1990 | Sakai et al. | 252/500 |

OTHER PUBLICATIONS

Journal of Electroanalogical Chemistry 1988, "Charge-Controllable Polypyrrole/Polyelectrolyte Composite Membranes", (T. Shimidzu, A. Ohtani, and K. Honda) pp. 323 to 337.
"Induction and Maintenance of Long-Term Potentiation in the Hippocampus", (T. V. P. Bliss, M. L. Errington and M. A. Lynch) pp. 213-225, NATO ASI Series, vol. 1119, 1988, Modulation of Synaptic Transmission and Plasticity in Nervous Systems.

Primary Examiner—Donald A. Griffin
Attorney, Agent, or Firm—Armstrong, Nikaido, Marmelstein Kubovcik & Murray

[57] ABSTRACT

An artificial plastic control device for plastically controlling an electric signal which comprises a pair of electrolytic electrodes arranged as opposed to each other with an electrolyte layer provided therebetween, the pair of electrodes being a first electrode formed over the surface thereof with an electropolymerized polymer film containing an anionic dopant and a second electrode formed over the surface thereof with an electropolymerized polymer film not containing the anionic dopant, the anionic dopant being capable of reversibly capturing or releasing a cation, and a pair of ionic conductivity measuring electrodes arranged as opposed to each other with the electrolyte layer provided therebetween.

8 Claims, 4 Drawing Sheets

① Change in Amount of Neurotransmitter
② Change in Number of Receptors
③ Change in Responce of Receptors
④ Newly Junction of Synapses

FIG. 7

PLASTIC CONTROL DEVICE

BACKGROUND OF THE INVENTION

1. Field of the Invention

The present invention relates to a plastic control device fabricated on the model of the plastic behavior of synapses More particularly, the present invention relates to an artificial plastic control device which simulates the plasticity of synaptic transmission associated with learning and memory in the living body.

2. Description of the Related Art

Information processing activities such as learning, memory, reasoning and like are very natural to organisms but are extremely difficult for existing computers which consist primarily of silicon devices because the computers presently available perform functions by simple devices according to complex software prepared therefor, whereas organisms include a system which itself has complex software incorporated therein. Accordingly, highly functional devices, if fabricated, will make it possible to use the inherent information processing process of organisms for engineering applications.

One of the distinct differences between the brain and the computer is memory. The memories (as means) in the computer are present independently of one another, and the capacity of the memories is determined in proportion to the number of devices concerned. On the other hand, the memories in the brain are present as associated with one another, and there is no proportional relation between the capacity of the memories and the number of devices. When a new memory is prepared, the memory is assigned a new address in the case of the computer, whereas with the brain, it is thought that the memory is assigned part of the existing network of devices.

Figure 6:
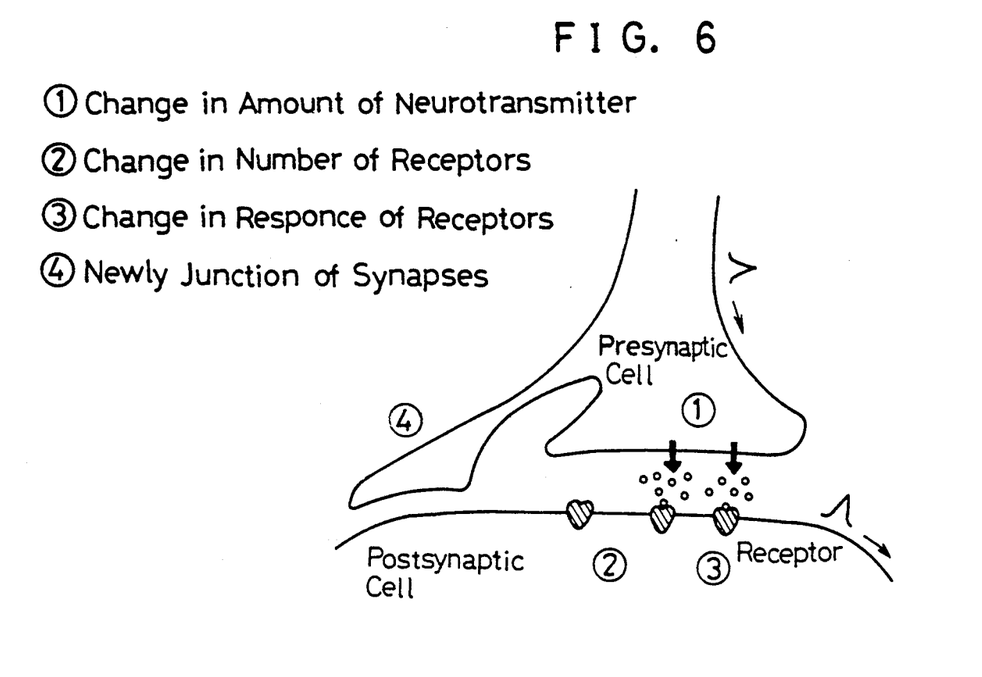
FIG. 6 is a diagram showing a synapse which is the junction between neurons.

In the living body, memory as an activity is observed as a state of the junction between neurons, i.e., in the form of "synaptic plasticity". FIG. 6 is a diagram showing a synapse which is the junction between two neurons, and main factors giving rise to synaptic plasticity. A typical example of such "synaptic plasticity" is seen at the junction between the perforant path and the granule cell of the rabbit hippocampus; it has been observed that the transmission efficiency increases as stimulation is given more frequently (T. V. P. Bliss et al., J. Physiol. 232(1973)331-).

From this viewpoint, on the other hand, reports are recently made on artificial presynaptic models. L. L. Miller et al, coated an electrode with a polymer containing a neurotransmitter, such as dopamine or glutamic acid, stating that the release of the neurotransmitter was controllable electrochemically (L. L. Miller et al., J. Am. Chem. Soc., 104(1982)5242-5244; ibid., 105 (1983)5271-5277; ibid., 105(1983)5278-5284). Another report says that when the polymer was prepared by electropolymerization (with use of a neurotransmitter as the dopant to be incorporated into the polymer during polymerization), the release of the neurotransmitter was similarly controllable electrochemically (R. L. Blankespoor et al., J. Chem. Soc., Chem. Commun., 1985) 90-92; Hiroaki Shinohara et al., NIPPON KAGAKU KAISHI No. 3(1986) 465-469). Further Shimidzu et al. used the combination of an electropolymerized film having anion capturing ability and an electropolymerized film having cation capturing ability as electropolymerized polymer films of improved function, suggesting the feasibility of a novel electrochemical deionization system as a substitute for conventional ion-exchange resins (T. Shimidzu et al., J. Electroanal. Chem., 251(1988)323-337).

The foregoing reports on various artificial presynaptic models all simulate only the release of neurotransmitters but do not disclose engineering applications of function of actual synapses, nor do they show such applications of plastic control.

We have already developed a control device which simulates the plasticity of synaptic transmission and in which the input signal transmission efficiency varies with time (plastic behavior) (Unexamined Japanese Patent Publication SHO 63-200396). However, the device has the problems of: (1) being irreversible, (2) using a stimulation signal, which is identical with the input, for varying the weight, and (3) necessitating a complex treatment such as potential sweeping.

The present invention, which has been accomplished in view of the above situation, provides an epoch-making plastic control device which exhibits the plastic behavior of synaptic transmission as described above and which comprises a simple circuit to realize reversibility.

Directing attention to electronically conducting polymers prepared by electropolymerization, we have carried out intensive research on the fabrication of devices which vary in signal transmission efficiency with time as stated above, using such polymers.

In the case where the charge carrier is electron is common electronically conducting polymers (as used as dry conductors), the conduction velocity is difficult to control, so that the polymer is difficult to use in plastic control devices. However, in the case of ion conductors wherein the charge carrier is an ion, it is possible to electrochemically control the release of the ion, i.e., dopant, into an electrolyte and incorporation of the dopant into the conducting polymer. On the other hand, it is difficult to provide a reversible plastic control device by a system wherein the variation with time or electrolytic current due to release or incorporation of the dopant during application of voltage is utilized directly for plastic control.

SUMMARY OF THE INVENTION

In view of the foregoing situation, we have found that a reversible plastic control device can be constructed with ease by detecting variations in the ion concentration of an electrolyte produced by the release and incorporation of a dopant in terms of variations in ionic conductivity and monitoring the resulting output signals in real time.

Accordingly, the present invention provides a plastic control device which comprises a pair of electrolytic electrodes arranged as opposed to each other with an electrolyte layer provided therebetween, the pair of electrodes being a first electrode formed over the surface thereof with an electropolymerized polymer film containing an anionic dopant and a second electrode formed over the surface thereof with an electropolymerized polymer film not containing the anionic dopant, the anionic dopant being capable of reversibly capturing or releasing a cation, and a pair of ionic conductivity measuring electrodes arranged as opposed to each other with the electrolyte layer provided therebetween.

The device has the unique characteristic that when a pulse voltage of a given potential range or continuous voltage is applied thereto as an input signal, the device exhibits a transmission efficiency which increases or decreases with the frequency of pulse application or duration of voltage application, making it easy or difficult for the current to pass through the device, the device further having such characteristics that it gradually restores its original responsiveness when polarity of the potential is reversed or the device is discharged by shortcircuiting. In realizing artificial data processors (neurocomputers) having data processing abilities, such as learning ability and memory ability, which are inherent in the living body, the plastic control device, unlike the existing semiconductor devices, provides many functions with a simple circuit as an epoch-making electric signal control device.

DESCRIPTION OF THE PREFERRED EMBODIMENT

The first electrode of the present invention functions as an electrode for capturing or releasing a cation during the application of voltage by the action of the electropolymerized polymer film formed thereon and the anionic dopant contained therein. On the other hand, the second electrode functions as an electrode for capturing or releasing an anion during the application of voltage by the action of the electropolymerized polymer film formed thereon.

The first electrode can be prepared easily by using the anionic dopant as the supporting electrolyte anion when the polymer film is formed on an electrode substrate.

The anionic dopant to be used is the ion of an anionic compound of relatively large molecular size which itself is less susceptible to uncoupling than usual supporting electrolyte anions, retainable in the polymer film with good stability and consequently capable of incorporating a cation as a counter ion into the film or releasing the cation therefrom. Examples of such dopants are compound anions comprising a polymer or long-chain hydrocarbon group (such as polyvinyl chain, polystyrene chain, higher alkyl group or higher alkylaryl group) having attached thereto a polar group (such as sulfate group, sulfonic acid group or carboxyl group) capable of capturing a cation as a counter ion. More specific examples of useful anions are poly(vinylsulfate) ion, poly(4-styrenesulfonate) ion, dodecylbenzensulfonate ion, polyacrylate ion, polymethacrylate ion and the like. The anionic dopant is used in the form of salt which is readily soluble in water, e.g., alkali metal salt, as the supporting electrolyte for the electrolytic polymerization for preparing the first electrode.

The second electrode can be prepared by forming the electropolymerized polymer film on an electrode substrate using a usual supporting electrolyte. Usually, the anion of the electrolyte incorporated in the resulting film is electrochemically removed (undoped) before the electrode is used. The anion of the supporting electrolyte is one which is easily removable from the polymer film formed and is usually a low-molecular-weight anion. Examples of such anions are chlorine ion, perchlorate ion, nitrate ion, tetrafluoroborate ion, hexafluorophosphate ion and the like. Such an anion is used usually in the form of an alkali metal salt as the supporting electrolyte. The anion can be undoped by electrochemical reduction, which may be effected by the constant-potential electrolytic process or constant-current electrolytic process. For example, the potential for constant-potential electrolysis is suitably about $-0.5$ to $-1.2$ V vs. Ag/AgCl, and it is suitable to use a current of $-0.1$ to $-1.0$ mA/cm$^2$ for constant-current electrolysis.

The monomers to be used for forming the electropolymerized polymer films include pyrrole and known electrochemically polymerizable monomers such as thiophene, furan, aniline and derivatives of these compounds. These monomers readily give an electronically conducting polymer film when subjected to electrochemical oxidation in an aqueous solution or an organic solvent (acetonitrile, nitrobenzen, propylene carbonate or the like) in the presence of the supporting electrolyte. It is desirable to use pyrrole and derivatives thereof among other monomers exemplified above since these compounds are polymerizable in an aqueous solution, permit use of a wide variety of supporting electrolytes as well as dopants, and are stable when oxidized. The monomer concentration is suitably about 0.05 to 0.2M although not limited specifically.

The electrolysis may be conducted by any of the constant-potential process, constant-current process and potential scanning process. For example, the potential for constant-potential electrolysis is suitably about 0.6 to about 1.2 V vs. Ag/AgCl, and the current for constant-current electrolysis is suitably 0.5 to 50 mA/cm$^2$. The thickness of the polymer film to be formed is usually in proportion to the quantity of electricity applied for the electropolymerization, can therefore be easily controlled within an allowable range dependent on the type of supporting electrolyte and the concentration of dopant used, and is generally suitably 50 to 5000 mC/cm$^2$.

It is suitable that the concentration of each of the supporting electrolytes be usually about 0.1 to about 0.5M although the concentration is dependent, for example, on the electrolytic conditions and the contemplated characteristics of the polymer film to be obtained eventually.

The plastic control device of the present invention can be prepared readily by arranging the first electrode and the second electrode as opposed to each other, arranging a pair of ionic conductivity measuring electrodes (third and fourth electrodes) similarly, and providing an electrolytic layer between each pair of electrodes. The electrolyte layer to be used may be formed by a solid electrolyte such as a solid polymer electrolyte which is prepared by dissolving an electrolyte in polyethylene oxide, polypropylene oxide or the like, or by a liquid electrolyte which is prepared by dissolving an electrolyte in an aqueous or like solution. The solid electrolyte is desirable to use, for example, because of ease of handling. The electrolyte to be used for the layer is preferably a salt provided by the combination of the anion of the supporting electrolyte used for preparing the polymer film of the second electrode and the cation of the supporting electrolyte used for preparing the polymer film of the first electrode. For example, when sodium chloride is used for preparing the polymer film of the second electrode and potassium poly(vinylsulfate) for the film of the first electrode, an aqueous solution of potassium chloride is desirable to use for the electrolyte layer. It is suitable that the concentration of the electrolyte solution be 0.1 mM to 0.1M although the concentration relates to the allowable quantities of cation and anion which can be incorporated into the respective polymer films of the first and second electrodes and which are dependent on the thickness of the films, and is therefore not limited specifically.

On the other hand, it is suitable to use platinum or like noble metal or carbon for the substrates of the pair of conductivity measuring electrodes and the first and second electrodes. Of these electrodes, the conductivity measuring electrodes (third and fourth electrodes) should have a large area per unit volume to be suitable. Accordingly, platinum black electrodes are suitable.

Pairs of first electrodes and second electrodes may be arranged in opposed relation. With the plastic control device comprising such pairs, the number of pairs of first and second electrodes across which voltage is applied may be altered suitably, whereby variations in cumulative conductivity between the electrodes can be detected. This achieves cumulative control corresponding to the number of pairs of electrodes across which voltage is applied, in addition to the aforementioned reversible plastic control effect.

Accordingly, the present invention also provides a plastic control device which comprises a group of first electrolytic electrode and a group of second electrolytic electrodes opposed to the group of first electrodes in a pair, with an electrolyte layer provided between the groups, the first electrodes being each formed over the surface thereof with an electropolymerized polymer film containing an anionic dopant, the second electrodes being each formed over the surface thereof with an electropolymerized polymer film not containing the anionic dopant, the anionic dopant being capable of reversibly capturing or releasing a cation, and a pair of ionic conductivity measuring electrodes arranged as opposed to each other with the electrolyte layer provided therebetween.

The operation of the present device will be described with reference to an example wherein poly(vinylsulfate) ion-doped polypyrrole (PPy/PVS) is used for the electropolymerized polymer film of the first electrode, chlorine ion-doped polypyrrole (PPy/Cl) is used, as reduced (PPy), for the electropolymerized polymer film of the second electrode, and an aqueous KCl solution is used for the electrolyte layer.

When a predetermined potential is applied across the first electrode as a cathode and the second electrode as an anode (i.e. when a predetermined current is passed therebetween), the following reactions occur, giving rise to deionization.

First electrode:
$$PPy^+/PVS^- + K^+ + e^- \leftrightarrow PPy/PVS^-.K^+$$

Second electrode: $PPy + Cl^- \leftrightarrow PPy^+/Cl^- + e^-$

Consequently, the ion concentration of the electrolyte decreases with the electrolysis time (amount of simulation), thereby decreasing the ionic conductivity of the electrolyte. The decrease is dependent on the area of electrode relative to the volume of the electrolyte layer, the thickness of the electropolymerized polymer film (allowable amount of dopant) and the ion concentration of the electrolyte layer. The speed of response is dependent on the ion concentration of the electrolyte layer. More specifically, the higher the ion concentration, the higher is the speed of response but the smaller is the variation. Further the above reactions occur reversely when the polarity of the electrodes is reversed or the circuit is shorted for discharge, increasing the ion concentration of the electrolytic solution and thereby increasing the conductivity of the electrolyte layer. A reversible plastic output can be obtained by monitoring the variation of the conductivity with the measuring electrodes (third and fourth electrodes) in real time. This makes it possible to control an electric signal in a mode resembling the plasticity of synaptic transmission in the living body.

Further another type of plastic control device of the present invention wherein first electrodes and second electrodes are arranged in pairs realizes cumulative control of an electric signal in corresponding relation with the number of electrode pairs to which voltage is applied.

EXAMPLES

The present invention will be described in detail with reference to the following examples.

EXAMPLE 1

First, the disk surface (about 0.07 cm$^2$ second electrode) of a solid cylindrical glassy carbon (GC) electrode was immersed in an aqueous solution containing 0.2M pyrrole and 0.5M potassium chloride and subjected to constant-current electrolytic oxidation at 0.1 mA (1.4 mA/cm$^2$) to form a chlorine ion-doped polypyrrole (PPy/Cl) thin film (2.5 C/cm$^2$: about 10 μm) on the GC disk electrode. The electrode was washed with pure water, then immersed in a 0.1M potassium chloride aqueous solution and subjected to electrolysis at a constant current of $-21$ μA ($-0.3$ mA/cm$^2$) until the potential decreased to not higher than $-1.0$ V vs. Ag/AgCl. Subsequently, the chlorine ion was released from the polypyrrole film to obtain a second electrode.

The disk surface (about 0.07 cm$^2$: first electrode) of another solid cylindrical GC electrode was immersed in an aqueous solution containing 0.2M pyrrole and 0.1M potassium poly(vinylsulfate) (about 1500 in polymerization degree) and subjected to constantcurrent electrolytic oxidation at 0.1 mA (1.4 mA/cm$^2$) to form a poly(vinylsulfate) ion-doped polypyrrole (PPy/PVS) thin film (2.5 C/cm$^2$ about 10 μm) on the GC disk electrode and obtain a first electrode. Since the PVS ion is of high molecular weight, the ion is not releasable from the film by reduction. For charge compensation, the film incorporates and releases a counter cation. The electrode is therefore serviceable as a cation capturing and releasing electrode.

Figure 1:
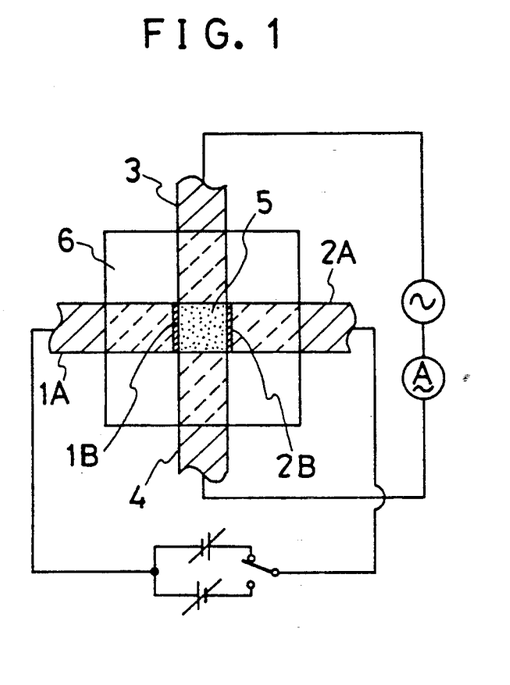
FIG. 1 is a diagram illustrating the construction of a plastic control device embodying the present invention.

A support of acrylic resin prepared was fixedly provided with a pair of bare solid cylindrical GC electrodes (third and fourth electrodes) arranged as opposed to each other for measuring the conductivity of an electrolytic solution. The first and second electrodes were similarly arranged as opposed to each other and fixed to the support to define a space by the four electrodes. A 0.01M potassium chloride aqueous solution was filled into the space to obtain a plastic control device of the invention as seen in FIG. 1. With reference to the drawing, indicated at 1A is the first electrode (GC disk electrode) of the invention, at 1B the electropolymerized polymer film (PPy/PVS: cation capturing and releasing film), at 2A the second electrode (GC disk electrode) of the invention, at 2B the electropolymerized polymer film (PPy/Cl reduced film: anion capturing and releasing film), at 3, 4 the pair of third and fourth electrodes (conductivity measuring electrodes), at 5 the electrolyte layer, and at 6 the acrylic resin support.

Figure 2:
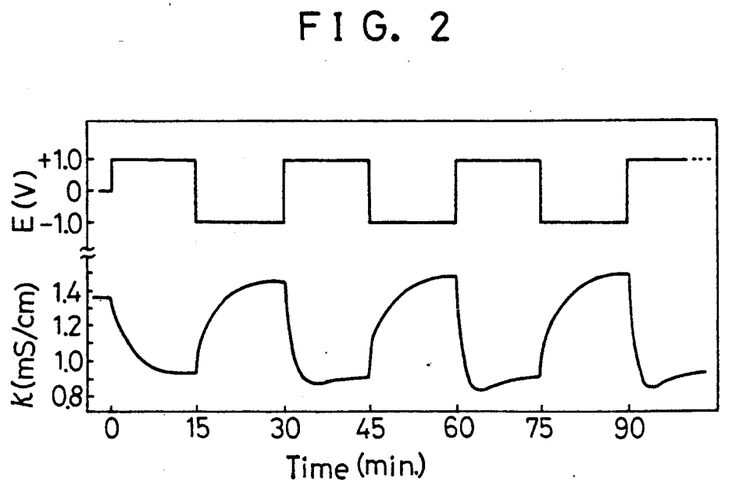
FIGS. 2 and 3 are diagrams illustrating plastic responses actually obtained by the plastic control device of FIG. 1, FIG. 2 showing a curve representing reversible ionic conductivity responses, and FIG. 3 showing a curve representing an ionic conductivity response to a pulse potential applied for an deionization operation.
Figure 3:
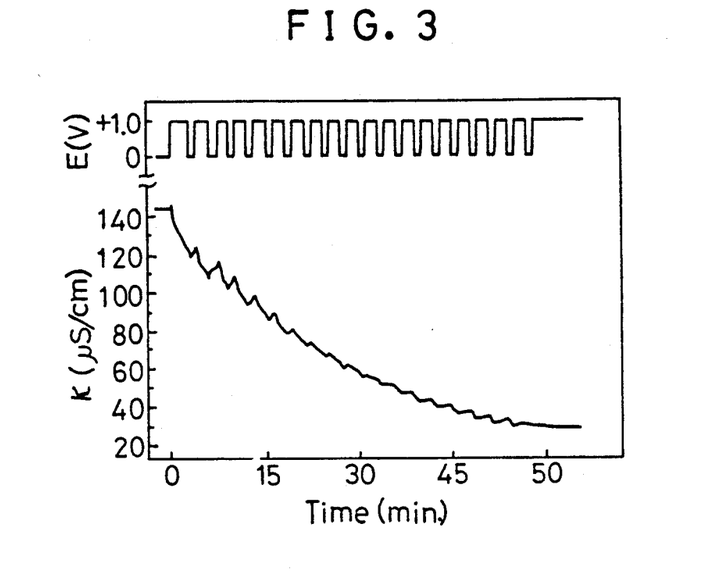

With the synaptic plasticity simulating device, a constant voltage of about 1 V was applied across the first electrode as a cathode and the second electrode as an anode, whereby the PPy/Cl reduced film of the second electrode was oxidized, incorporating chlorine ion, and the PPy/PVS film of the first electrode was reduced, incorporating potassium ion. Consequently, the ion concentration of the potassium chloride aqueous solution, i.e., the electrolyte layer, decreased with electrolysis time, and the conductivity detected by the third and fourth electrodes decreased plastically. Further when the polarity of voltage applied across the first and second electrode was reversed, reactions exactly reverse to the above occurred, plastically increasing the conductivity. FIG. 2 shows a conductivity response curves thus obtained actually, revealing reversible plastic responses. The reverse reactions can be caused not only by reversing the polarity of the electrodes, but the responsiveness can be restored with good stability also by short-circuit discharge. Further with the potassium chloride concentration of the electrolyte layer altered to 1 mM, a pulse voltage of 1V was applied to the device for an instance of deionization. FIG. 3 showing the result indicates that the conductivity was highly responsive to the stimulation signal. This behavior resembles the plasticity of synaptic transmission in the living body, substantiating the plastic control function of the device.

COMPARATIVE EXAMPLE

When one or both of the polypyrrole thin films of the first and second electrodes were absent, i.e., when these electrodes were bare electrodes, the device failed to effect satisfactory deionization, rather permitting hydrolysis of water and therefore resulting in an increased conductivity. This reveals that only when the first and second electrodes are formed with electropolymerized polymer films for capturing and releasing both of cations and anions, satisfactory plastic behavior can be obtained.

EXAMPLE 2

First, a Pt wire, 1 mm in diameter, was covered with a Teflon tube, and three lengths of the wire were bundled and sheathed in a glass tube for use as electrodes for forming an electropolymerized polymer film thereon. The Pt disk faces (about $7.85 \times 10^{-3}$ cm$^2 \times 3$) were used as electrode substrates. The group of disk electrodes were immersed in an aqueous solution containing 0.2M pyrrole and 0.5M potassium chloride and subjected to constant-current electrolytic oxidation at 0.1 mA (1.4 mA/cm$^2$) to form a polypyrrole (PPy/Cl) thin film (2.5 C/cm$^2$ about 10 μm) on each disk electrode. The group of electrodes was washed with pure water, then immersed in a 0.1M potassium chloride aqueous solution and subjected to electrolysis at a constant current of $-21$ μA ($-0.3$ mA/cm$^2$) until the potential decreased to not higher than $-0.1$ V Ag-/AgCl to form a group of second electrodes of the invention with chlorine ion released from the films.

Another group of Pt disk electrodes (about $7.85 \times 10^{-3}$ cm$^2 \times 3$) sheathed in a glass tube was immersed in an aqueous solution containing 0.2M pyrrole and 0.1M potassium poly(vinylsulfate) (polymerization degree: about 1500) and subjected to constantcurrent electrolytic oxidation at 0.1 mA (1.4 mA/cm$^2$) to form a poly(vinylsulfate) ion-doped polypyrrole (PPy/PVS) thin film (2.5 C/cm$^2$: about 10 μm) on each Pt disk electrode and then a group of first electrodes was obtained. Since the PVS ion is of high molecular weight, the ion is not releasable from the films by reduction. For charge compensation, the films incorporate and release a counter cation. The electrodes were therefore serviceable as a cation capturing and releasing electrodes.

Figure 4:
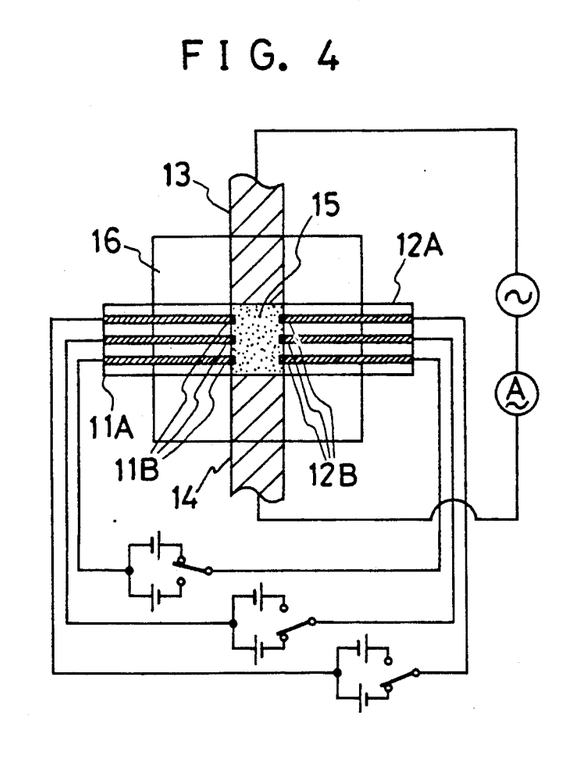
FIG. 4 is a diagram illustrating the construction of a cumulatively controllable plastic control device as another embodiment of the invention.

An acrylic resin support was prepared which was fixedly provided with a pair of bare solid cylindrical glassy carbon (GC) electrodes arranged as opposed to each other for measuring the conductivity of an electrolytic solution. The groups of first and second electrodes were similarly arranged as opposed to each other and fixed to the support to define a space by the electrode pair and groups. A 0.01M potassium chloride aqueous solution was filled into the space to obtain a plastic control device of the invention adapted for cumulative control and shown in FIG. 4. With reference to this drawing, indicated at 11A is the group of first electrodes (Pt disk electrodes) of the invention, at 11B the electropolymerized polymer film (PPy/PVS: cation capturing and releasing film), at 12A the group of second electrodes (Pt disk electrodes), at 12B the electropolymerized polymer film (PPy/Cl reduced film: anion capturing and releasing film), at 13, 14 the pair of third and fourth electrodes (conductivity measuring electrodes), at 15 the electrolyte layer, and at 16 the acrylic resin support.

Figure 5:
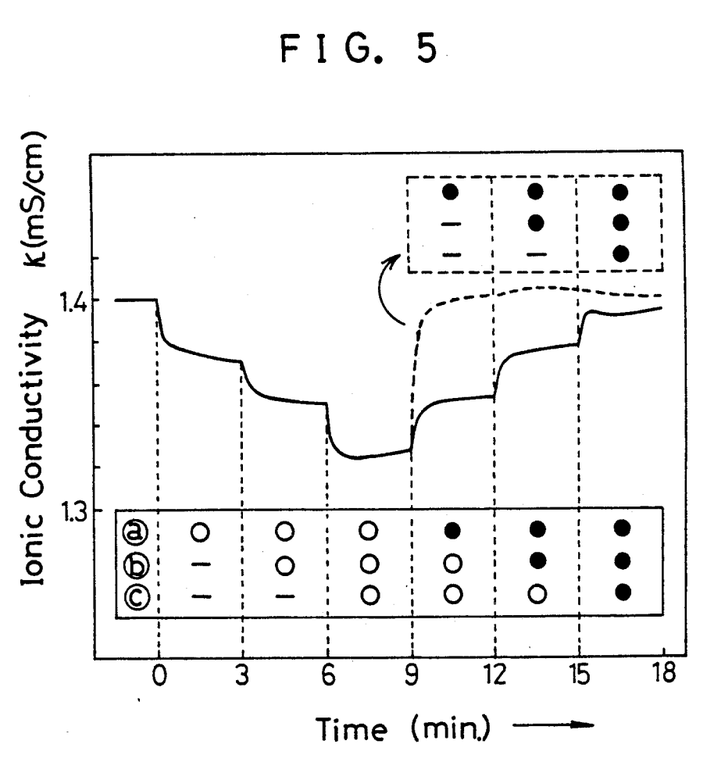
FIG. 5 is a diagram illustrating reversible cumulative plastic responses actually obtained by the control device of FIG. 4.

With the cumulatively controllable plastic control device, a constant voltage of about 1 V was applied across one of the first electrodes as a cathode and one of the second electrodes as an anode, whereby the PPy/Cl reduced film on the second electrode was doped with chlorine ion on oxidation, and the PPy/PVS film on the first electrode was doped with potassium ion on reduction. Consequently, the ion concentrations of the potassium chloride aqueous solution, i.e., the electrolyte layer, decreased with electrolysis time, plastically decreasing the conductivity detected by the third and fourth electrodes. When the voltage of about 1 V was subsequently applied across the second and then the third of the first and second electrodes similarly, the same reactions as above occurred, with the result that deionization took place cumulatively to decrement the conductivity. Further when the polarity of the voltage applied across the groups of first and second electrodes is reversed from pair to pair, reactions exactly reverse to the above occur, plastically increasing the conductivity cumulatively. FIG. 5 shows a conductivity response curve thus obtained actually. The present device has such cumulative circuit and exhibits reversible plastic responsiveness. In the drawing, the blank circular mark stands for the application of $+1$ V with the second electrode serving as an anode, the solid circular mark for the application of $-1$ V, and the dash mark for an open circuit. In the reverse reactions, the initial conductivity is restored merely by applying −1 V across the first pair of electrodes with the circuits of the other pairs of electrodes opened (as represented by a dotted line). The reverse reactions can be caused not only by reversing the polarity of the electrodes, but the conductivity can be restored with good stability also by short-circuit discharge. The behavior resembles the plasticity of synaptic transmission in the living body and is the function of the plastic control device having the cumulative circuit.

In the case of one type of plastic control device of the present invention, the voltage applied across the first electrode and the second electrode serves as an input signal, and the current transmission efficiency gradually varies with the duration of voltage application or the frequency of pulse application. Moreover, the variation in the transmission efficiency is reversible, for example, by changing the polarity of the electrodes. Thus, the device exhibits unique voltage-current plastic responses and is useful as an electric signal control device for various applications. The plastic control device of another type wherein first electrodes and second electrodes are arranged in pairs produces the effect of a cumulative circuit that the reactions conducted by the individual pairs of electrodes are added up to a cumulative result which is reflected in the variation of current transmission efficiency.

Figure 7:
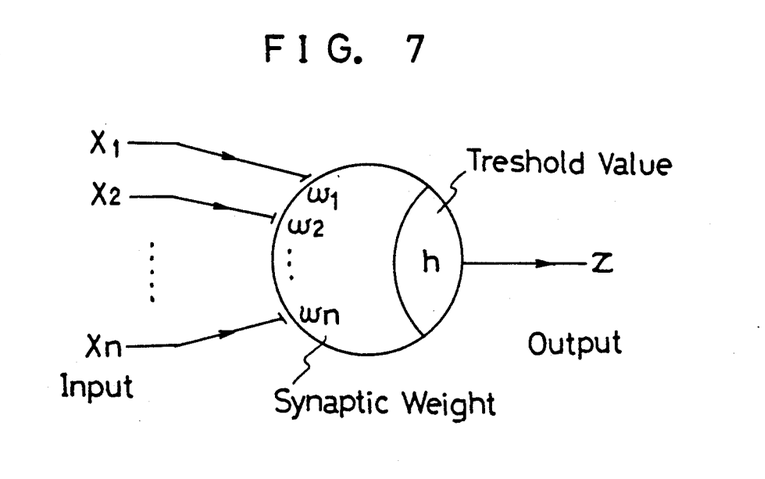
FIG. 7 is a diagram showing a mathematical model of neuron.

The plastic control device of the present invention is especially indispensable in realizing artificial data processors (neurocomputers) simulating the information processing abilities inherent in organisms, such as learning ability. FIG. 7 shows a mathematical model of neuron generally used at present for the research in the field of so-called neural nets or neurocomputers. In the drawing, $w_n$ is a quantity representing the efficiency of synaptic junction and is termed "synaptic weight". Information processing in organisms, such as learning and memory, is thought attributable to the variation (plasticity) of the synaptic weight. The synaptic plasticity simulating device of the present invention realizes the function of $w_n$ by one device and will offer an immeasurable advantage to the realization of neurocomputers in the future.

What we claimed is:

1. A plastic control device which comprises a pair of electrolytic electrodes arranged as opposed to each other with an electrolyte layer provided therebetween, the pair of electrodes being a first electrode formed over the surface thereof with an electropolymerized polymer film containing an anionic dopant and a second electrode formed over the surface thereof with an electropolymerized polymer film not containing the anionic dopant, the anionic dopant being capable of reversibly capturing or releasing a cation, and a pair of ionic conductivity measuring electrodes arranged as opposed to each other with the electrolyte layer provided therebetween.

2. A plastic control device which comprises a group of first electrolytic electrodes and a group of second electrolytic electrodes opposed to the group of first electrodes in a pair, with an electrolyte layer provided between the groups, the first electrodes being each formed over the surface thereof with an electropolymerized polymer film containing an anionic dopant, the second electrodes being each formed over the surface thereof with an electropolymerized polymer film not containing the anionic dopant, the anionic dopant being capable of reversibly capturing or releasing a cation, and a pair of ionic conductivity measuring electrodes arranged as opposed to each other with the electrolyte layer provided therebetween.

3. The device of claim 1 or claim 2 in which the anionic dopant comprises a polymer or long-chain hydrocarbon group having attached thereto a polar group capable of capturing a cation as a counter ion.

4. The device of claim 1 or claim 2 in which the anionic dopant is poly(vinylsulfate) ion, poly(4-styrenesulfonate) ion, dodecylbenzenesulfonate ion, polyacrylate ion or polymethacrylate ion.

5. The device of claim 1 or claim 2 in which the electropolymerized polymer film is made from an electrochemically polymerizable monomer such as pyrrole, thiophene, furan or aniline or derivatives thereof.

6. The device of claim 1 or claim 2 in which the electrolyte layer comprises a solid electrolyte or a liquid electrolyte.

7. The device of claim 1 or claim 2 in which the first and second electrodes and the pair of conductivity measuring electrodes each made of a noble metal or carbon.

8. The device of claim 1 or claim 2 which is used as an electric signal control device.

* * * * *

UNITED STATES PATENT AND TRADEMARK OFFICE
CERTIFICATE OF CORRECTION

PATENT NO. : 5,041,946
DATED : August 20, 1991
INVENTOR(S) : Masahiro ISEKI et al It is certified that error appears in the above-identified patent and that said Letters Patent is hereby corrected as shown below:

On the cover page, Item [75], after "Japan", insert -- Koichi Kuhara, Tsukuba, Japan --.

Signed and Sealed this

Twelfth Day of January, 1993

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 5,041,946
DATED : August 20, 1991
INVENTOR(S) : Masahiro ISEKI

It is certified that error appears in the above-identified patent and that said Letters Patent is hereby corrected as shown below:

On the title page, Item [56], under Other Publications, first line, "Electroanalogical" should read -- Electroanalytical --.

Fig. 5, delete "Ionic Conductivity".

Fig. 7, "Treshold" should read "Threshold".

Column 1, line 8, after "synapses", insert -- . --.

Column 2, line 29, delete "is", second occurrence, and insert therefor -- in --.

Column 6, line 35, after "0.07 cm$^2$" insert -- : --;

line 53, "constantcurrent" should read -- constant current --.

Column 8, line 10, "constantcurrent" should read -- constant current --.

Signed and Sealed this

Twelfth Day of October, 1993

Attest:

BRUCE LEHMAN

Attesting Officer     Commissioner of Patents and Trademarks